United States Patent
Gunzelmann et al.

(10) Patent No.: US 6,614,835 B2
(45) Date of Patent: Sep. 2, 2003

(54) ACQUISITION METHOD AND CONFIGURATION FOR CARRYING OUT THE METHOD

(75) Inventors: Bertram Gunzelmann, Augsburg (DE); Arkadi Molev-Shteiman, Bnei Brak (IL)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/767,803

(22) Filed: Jan. 22, 2001

(65) Prior Publication Data

US 2001/0028673 A1 Oct. 11, 2001

Related U.S. Application Data

(63) Continuation of application No. PCT/DE99/01980, filed on Jul. 1, 1999.

(30) Foreign Application Priority Data

Jul. 21, 1998 (DE) .......................... 198 32 851

(51) Int. Cl.$^7$ ................................. H04B 1/69
(52) U.S. Cl. ......................... 375/150; 375/142
(58) Field of Search ................. 375/134, 137, 375/142, 143, 144, 145, 152; 370/320, 335, 341, 342, 441, 445

(56) References Cited

U.S. PATENT DOCUMENTS

| | | | | |
|---|---|---|---|---|
| 4,361,891 A | * | 11/1982 | Lobenstein et al. | 370/515 |
| 4,730,340 A | * | 3/1988 | Frazier, Jr. | 375/207 |
| 5,440,311 A | * | 8/1995 | Gallagher et al. | 342/132 |
| 5,768,306 A | | 6/1998 | Sawahashi et al. | |
| 5,793,796 A | * | 8/1998 | Hulbert et al. | 375/150 |
| 5,910,948 A | * | 6/1999 | Shou et al. | 370/335 |
| 5,953,367 A | * | 9/1999 | Zhodzicshsky et al. | 375/147 |
| 6,044,104 A | * | 3/2000 | Watanabe | 375/200 |
| 6,078,608 A | | 6/2000 | Ohtsuka et al. | |
| 6,115,413 A | * | 9/2000 | Lattard et al. | 375/200 |
| 6,154,487 A | * | 11/2000 | Murai et al. | 375/150 |
| 6,208,291 B1 | * | 3/2001 | Krasner | 342/357.12 |
| 6,226,319 B1 | * | 5/2001 | Ohtsuka et al. | 375/151 |
| 6,359,875 B1 | | 3/2002 | Hamada et al. | |

FOREIGN PATENT DOCUMENTS

| | | |
|---|---|---|
| EP | 0 661 830 A2 | 7/1995 |
| EP | 0 749 223 A1 | 12/1996 |
| EP | 0 852 432 A2 | 7/1998 |
| JP | 2-65331 | 3/1990 |
| JP | 11-122216 | 4/1999 |

* cited by examiner

*Primary Examiner*—Emmanuel Bayard
(74) *Attorney, Agent, or Firm*—Laurence A. Greenberg; Werner H. Stemer; Ralph E. Locher

(57) ABSTRACT

A communications acquisition method includes a correlation of a received, coded spread sequence having a length of m bits with a locally generated spread sequence m times, in each case delayed by one bit, in order to form m correlation responses. Each correlation response is added, with a delay, to a succeeding correlation response to form a correlation result, the delay being an integer multiple of m and of a further bit. Finally, a maximum search is carried out over all m correlation results. A configuration for carrying out the method includes a correlator having an output connected to a first input of an adder and also to a second input of the adder through a delay element.

4 Claims, 2 Drawing Sheets

ACQUISITION METHOD AND CONFIGURATION FOR CARRYING OUT THE METHOD

CROSS-REFERENCE TO RELATED APPLICATION

This application is a continuation of copending International Application No. PCT/DE99/01980, filed Jul. 1, 1999, which designated the United States.

BACKGROUND OF THE INVENTION

Field of the Invention

The invention lies in the field of communications. The invention relates to an acquisition method in which a received, coded spread sequence having a length of m bits is correlated with a locally generated spread sequence m times, in each case delayed by one bit, in order to form m correlation responses. The invention also relates to a configuration for carrying out the method.

One fundamental spread method is the direct sequence method, in which, before transmission, a message is stretched, bit by bit, to a great extent over time and is modulated with a pseudo-random binary sequence. If the receiver knows the binary sequence, the receiver can extract the message from the pseudo-random noise signal produced.

Such methods are used in data communication, position finding and navigation. A problem that arises in such applications is that a receiver receives signals from a number of transmitters, and the time relationship of the signals must then be determined in order to identify the signals.

One important field of application for such a method is, in particular, real-time satellite navigation using the NAVSTAR GPS system (Navigation System With Timing And Ranging, Global Positioning System). For such a system, a large number of satellites are used as a transmitter network, and are controlled from ground stations or monitoring stations. At least four satellites must be in a receiver's field of view in order to find the position of the receiver in three dimensions. The messages from the transmitters are decrypted in the receiver to allow the necessary calculations to be carried out based upon them. For a receiver to be able to identify a satellite and to be able to evaluate its information, the receiver must know a transmitter-specific code (gold code), which is transmitted as a periodic signal sequence of predetermined length. In order to find the code, all the codes of the satellites are stored in the receiver. The code of a random satellite is then normally produced first of all, and is compared with the received code. If the code is not the expected satellite—as is normally the case—comparisons with the stored codes must be carried out until a match is found.

Furthermore, because the phase of each arriving signal is unknown, the signal with the received code must be shifted until a possible match is found. The comparison is carried out through the correlation function of the signal, which becomes virtually 1023 when synchronization occurs. If one considers all possible variants for such a search process, it is necessary, in principle, to accept long search times.

A search grid with 1023 search cells must be checked for a match with the gold-code spread sequence of 1023 bits, with a time interval equal to one bit length being specified between two search cells. The check results in a resolution of ½ a bit length. With optimum synchronization, the sampling time is chosen to obtain the maximum correlation response amplitude (see FIG. 2). The selection also results in the maximum signal-to-noise ratio. In the worst case, the signal power may be reduced down to one quarter of this level.

A prior art method for reducing the power reduction is to refine the search grid by reducing the time interval between search positions to a half or a quarter. However, the number of search processes must also be doubled or quadrupled so that the acquisition time is considerably lengthened.

SUMMARY OF THE INVENTION

It is accordingly an object of the invention to provide an acquisition method and configuration for carrying out the method that overcomes the hereinafore-mentioned disadvantages of the heretofore-known methods and devices of this general type and that reduces the acquisition time.

With the foregoing and other objects in view, there is provided, in accordance with the invention, a communication acquisition method, including the steps of forming m correlation responses by correlating a received, coded spread sequence having a length of m bits with a locally generated spread sequence m times, respectively delayed by one bit, forming a correlation result by delaying each correlation response and adding each correlation response to a succeeding correlation response, the delay being an integer multiple i of m and of a further bit, where i=0, 1, 2, 3, . . . , and carrying out a maximum search over all m correlation results.

In accordance with another mode of the invention, the locally generated spread sequence is a section of a transmitted spread sequence.

With the objects of the invention in view, there is also provided a configuration for performing a communications acquisition, including an adder having a first adder input, a second adder input, and an adder output for outputting a correlation result, a delay device having a delay input, a delay output connected to the second adder input, and a delay being an integer multiple i of m and of a further bit, where i=0, 1, 2, 3, . . . , a correlator having a correlator output connected to the first adder input and to the delay input, the correlator configured to receive a coded spread sequence having a length of m bits and to correlate the coded spread sequence with a locally generated spread sequence m times, in each case delayed by one bit, the correlator outputting m correlation responses at the correlator output, and a search unit connected to the adder output and configured to carry out a maximum search over all m correlation results.

In accordance with a concomitant feature of the invention, the adder, the delay device, the correlator, and the search unit are adders, delay devices, correlators, and search units, respectively.

Reduction of the acquisition time is achieved in that each correlation response is delayed and is added to a succeeding correlation response to form a correlation result, in that the delay is an integer multiple i (i=0, 1, 2 . . . ) of m and of a further bit, and in that a maximum search is carried out over all m correlation results. If i>0, the method guarantees optimum results only for spread sequences that are not modulated with data.

One basic idea of the invention is, accordingly, for two adjacent search cells to be linked to one another. The result of such linking is that the correlation result has a broadened curve shape in the critical upper region in comparison with a conventional curve shape. The broadening amounts to one bit length, and the broadening does not result in any reduction in signal power. As such, the amplitude of the correlation response is independent of exact synchronization of the sampling time and of the search grid. At the same time, the signal-to-noise ratio is considerably improved by comparison with the worst case described above.

A preferred development of the invention is for the locally generated spread sequence to be a section of the transmitted spread sequence. This results in a further improvement of the acquisition time, particularly with long spread sequences.

For the configuration, reduction of the acquisition time is achieved by simple circuitry where the output of a correlator is connected to a first input of an adder, and where the output of the correlator is connected to a second input of the adder through a delay element. A maximum search unit is adapted to carry out a maximum search over all the correlation results.

Other features that are considered as characteristic for the invention are set forth in the appended claims.

Although the invention is illustrated and described herein as embodied in an acquisition method and configuration for carrying out the method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
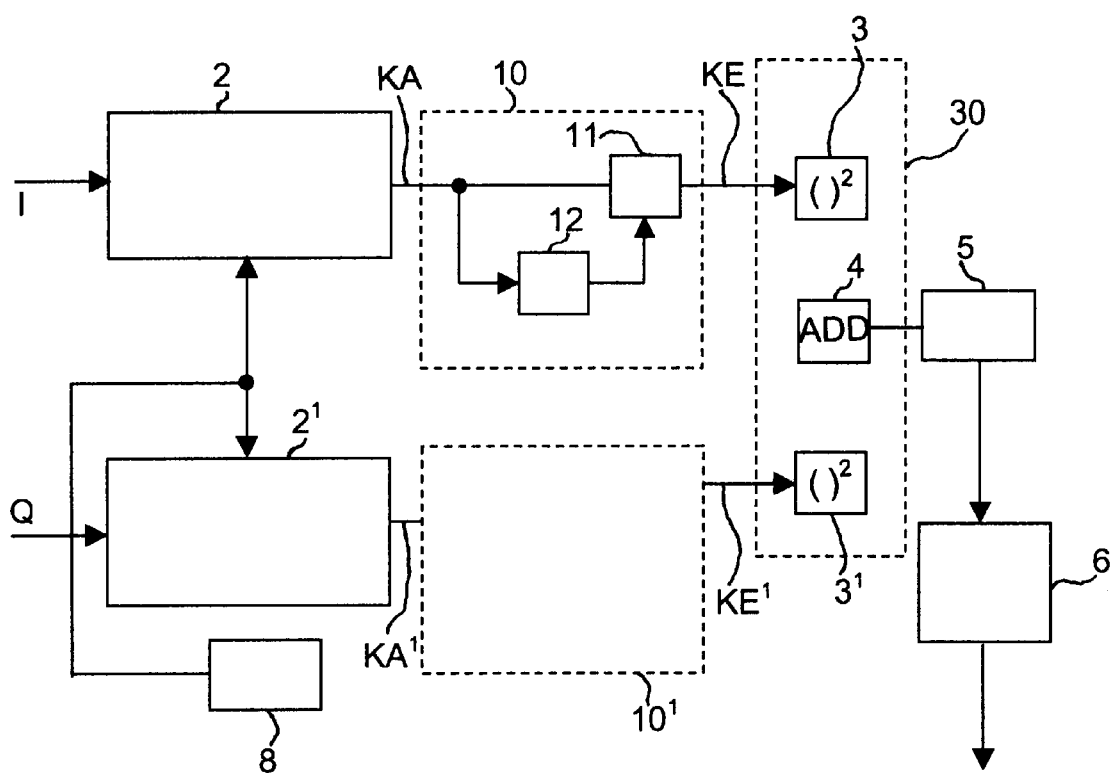
FIG. 1 is a block circuit diagram of a receiver according to the invention for the GPS navigation system.

In all the figures of the drawing, sub-features and integral parts that correspond to one another bear the same reference symbol in each case.

Referring now to the figures of the drawings in detail and first, particularly to FIG. 1 thereof, there is shown a receiver 1 for carrying out a spread method that can be used, for example, in data communication, in mobile radio, and also for position finding and navigation. The configuration and function of such a receiver 1 are described below for an application in the GPS position-finding and navigation system because these operations are essentially typical of the operations used for a spread method in all other receivers. A transmitter-specific signal, the gold code of the satellite in question, is found from the received signal that, in addition to the signal from a quite specific transmitter, also contains the information from all the other effective transmitters from the noise level of the entire signal.

The overall signal coming from a non-illustrated antenna as a spread sequence is quadrature-modulated and is mixed to baseband with the aid of a quadrature modulator. A quadrature component Q and an in-phase component I are each respectively quantized by a non-illustrated analog/digital converter having a word length of one bit.

Figure 2:
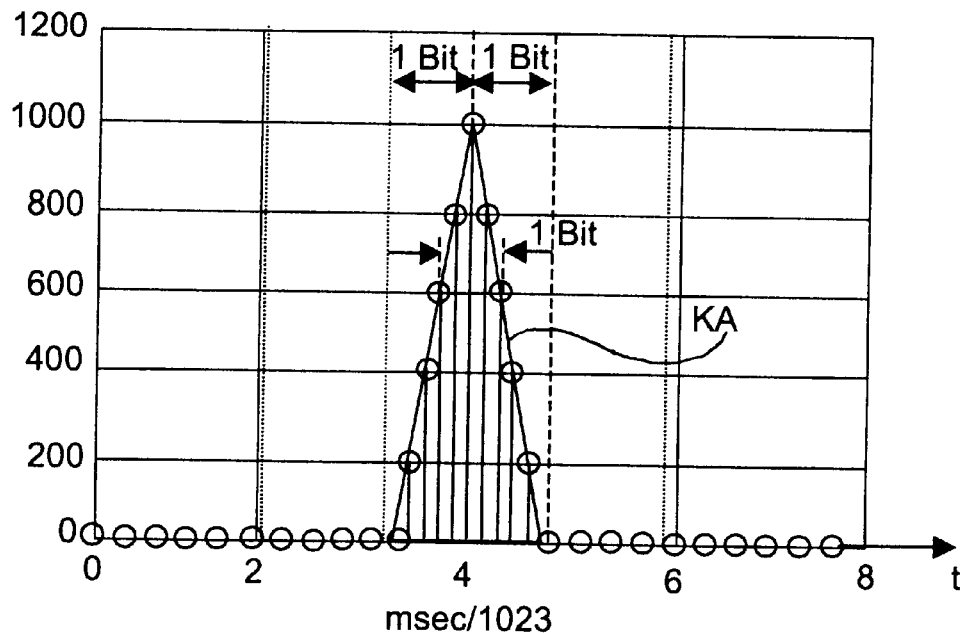
FIG. 2 is a graph plotting a correlation response of the receiver of FIG. 1.

The signals are then supplied in two paths to correlators 2 and 2' of the same type. In each of the correlators 2, 2' the gold code of the associated satellite is found from the noise level of the overall signal. A correlation response KA or KA', respectively, can be picked off as output signals at the outputs of the correlators 2, 2', as shown in FIG. 2.

The correlation responses KA, KA' are each respectively subjected to processing in a physically identical configuration 10, 10', which will be described in detail further below. The output signals from the configurations 10, 10' are supplied respectively as the correlation result KE or KE' to a power calculator 30. In the power calculator 30, the squares of the magnitudes from the two paths are calculated in a respective unit 3, 3' and are added up in an adder 4. The square root of the added-up signal is taken in the unit 5 and, finally, the signal strength is accumulated M times in an accumulator 6 in order to improve the reliability of the determined result. A maximum search unit 13 for carrying out a maximum search over the correlator result is adapted to carry out a maximum search over all the correlation results KE, KE'.

A gold-code generator 8 supplies the correlators 2, 2' with the gold codes to be used for the search.

Because the first path (correlator 2 and configuration 10) and the second path (correlator 2' and configuration 10') are identical, and because the signals are processed in the same way, the following description is limited to the first path, but likewise applies to the second path.

The received spread sequence having a length of m bits is correlated with a spread sequence generated in the gold-code generator 8 in a conventional manner in the correlator m times, in each case delayed by one bit, in order to form m correlation responses.

The correlation response KA at the output of the correlator 2 is, according to FIG. 2 and with optimum time conditions (in this case, i.e., t=4), a pulse having a maximum amplitude peak when a complete match is found between the received spread sequence I and the spread sequence generated locally by the gold-code generator 8, including its phase angle. Typically, the curve of the correlation response KA rises from 0 V or falls to 0 V within ±1 bit.

It is noteworthy that the curve profile corresponds to a correlation response from a conventional correlator. If one assumes, in this case, the conventional search grid with a width of one bit, the worst-case offset that can occur is half a bit from the optimum scanning time. As can be seen for the case in FIG. 2, such an offset would produce a maximum power loss of 6 dB.

In order to avoid such a power reduction, an average of the correlation responses KA from two adjacent search cells is produced in the configuration 10. For such a purpose, each correlation response KA is delayed and is added to the correlation response KA from the adjacent search cell to form the correlation result KE shown in FIG. 3. For such a purpose, the correlation response KA is supplied on one hand directly to an input of an adder 11, and on the other hand through a delay element 12 to another input of the adder 11.

The delay in the delay element 12 is optionally an integer multiple i (i=0, 1, 2, 3, . . . ) of m and of a further bit. Accordingly, depending on the chosen delay, the correlation responses KA from two immediately adjacent bits, or from two bits that are adjacent but are in successive spread sequences, are linked to one another. The latter case (i>0) guarantees optimum results only when the spread sequence is not modulated with data.

Figure 3:
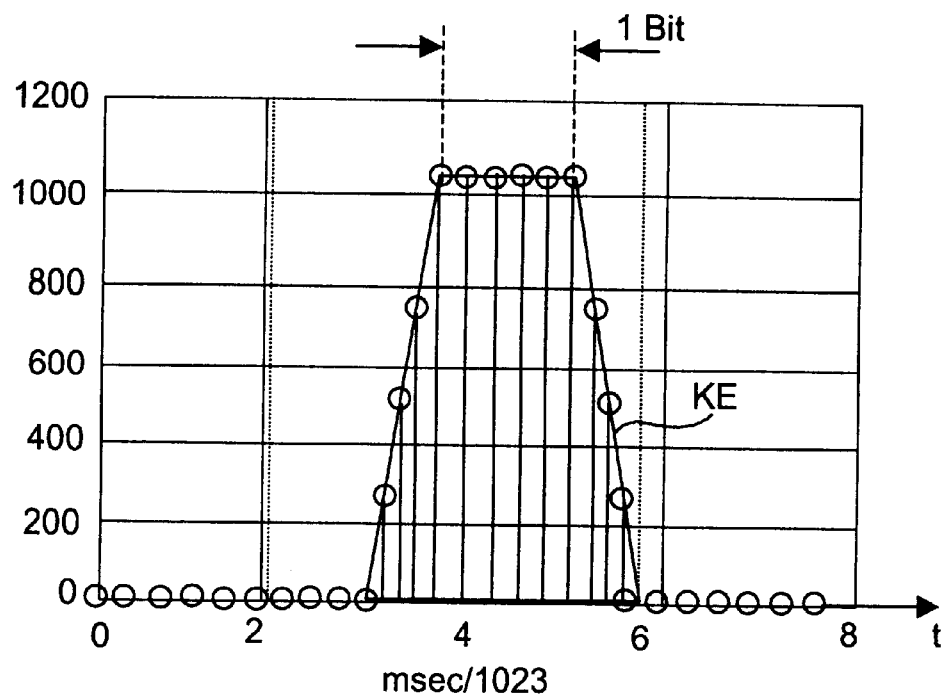
FIG. 3 is a graph plotting a correlation result of the receiver of FIG. 1.

According to FIG. 3, the formation of the correlation result KE results in a maximum amplitude at the same level as that of the correlation response KA according to FIG. 2, but additionally with a broadening in the region of the maximum amplitude, which corresponds to the length of a search grid field, that is to say 1 bit. The signal energy within a complete search grid field is, thus, the same, and the worst-case parameters described above no longer apply. Thus, the maximum amplitude is independent of the exact timing and, nevertheless, an improvement in the signal-to-noise ratio is achieved in comparison with the worst case described above, despite the 3 dB increase in the noise.

We claim:

1. A communication acquisition method, which comprises:

forming m correlation responses by correlating a received, coded spread sequence having a length of m bits with a locally generated spread sequence m times, respectively delayed by one bit;

forming a correlation result by delaying each correlation response and adding each correlation response to a succeeding correlation response, the delay being an integer multiple i of m and of a further bit, where i=0, 1, 2, 3, . . . ; and carrying out a maximum search over all m correlation results.

2. The method according to claim 1, wherein the locally generated spread sequence is a section of a transmitted spread sequence.

3. A configuration for performing a communications acquisition, comprising:

an adder having a first adder input, a second adder input, and an adder output for outputting a correlation result;

a delay device having a delay input, a delay output connected to said second adder input, and a delay being an integer multiple i of m and of a further bit, where i=0, 1, 2, 3, . . . ;

a correlator having a correlator output connected to said first adder input and to said delay input, said correlator configured to receive a coded spread sequence having a length of m bits and to correlate the coded spread sequence with a locally generated spread sequence m times, in each case delayed by one bit, said correlator outputting m correlation responses at said correlator output; and a search unit connected to said adder output and configured to carry out a maximum search over all m correlation results.

4. A configuration for performing a communications acquisition, comprising:

adders each having a first adder input, a second adder input, and an adder output for outputting a correlation result;

delay devices each having a delay input, a delay output connected to said second adder input of a respective one of said adders, and a delay being an integer multiple i of m and of a further bit, where i=0, 1, 2, 3, . . . ;

correlators each having a correlator output connected to said first adder input of a respective one of said adders and to said delay input of a respective one of said delay devices, said correlators each configured to receive a coded spread sequence having a length of m bits and to correlate the coded spread sequence with a locally generated spread sequence m times, in each case delayed by one bit, said correlators each outputting m correlation responses at said correlator output; and search units each connected to said adder output of a respective one of said adders and each configured to carry out a maximum search over all m correlation results.

* * * * *